V. CRITES.
TRAP HOLDER.
APPLICATION FILED DEC. 2, 1911.
1,030,165.
Patented June 18, 1912.
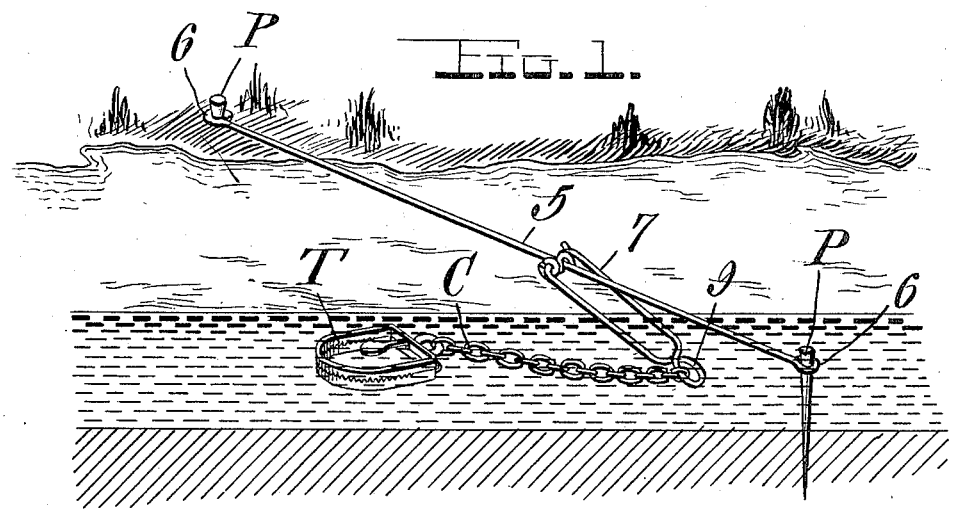
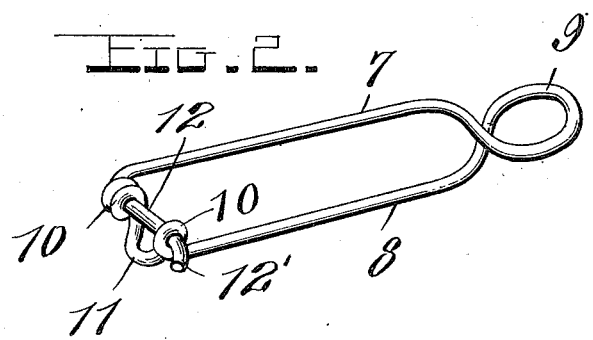
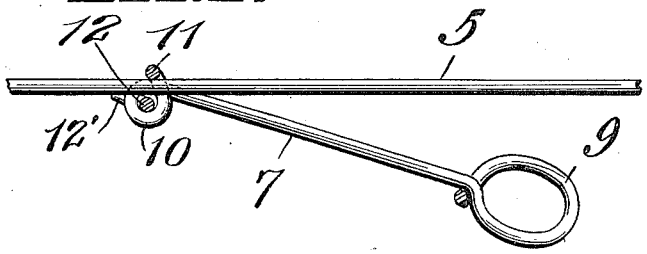
Inventor
Valentine Crites,
Witnesses

UNITED STATES PATENT OFFICE.

VALENTINE CRITES, OF TANNER, WEST VIRGINIA.

TRAP-HOLDER.

1,030,165.  Specification of Letters Patent.  Patented June 18, 1912.

Application filed December 2, 1911. Serial No. 663,556.

*To all whom it may concern:*

Be it known that I, VALENTINE CRITES, a citizen of the United States, residing at Tanner, in the county of Gilmer and State of West Virginia, have invented certain new and useful Improvements in Trap-Holders, of which the following is a specification, reference being had to the accompanying drawings.

This invention relates to devices of that character for holding animal traps to prevent the animal after being caught in the same from escaping by dragging the trap from the place where it is set.

The primary object of the invention resides in the provision of a very novel device which is particularly designed for holding traps of that character whch are set upon the bed or bank of a river or stream for the trapping of water animals such as beavers, whereby the animal is prevented from escaping to the bank and is held under the water so that the drowning of the animal is assured.

Another object of the invention is to provide a rod to be anchored to the bank and bed of a stream, and a movable trap holding member arranged on said rod and having the trap chain attached thereto, said member being adapted to bind on the rod by an animal pulling the trap in an attempt to climb the bank of the stream.

A further object of the invention is to provide a trap holding device formed of a single length of wire bent intermediate of its ends to form a loop or attachment to the trap chain, one end of said wire being coiled about the other end thereof and having a U-shaped portion, the latter end of the wire after extending through the coils being bent to prevent its disengagement from the coils, in combination with a rod having a loop formed in each end and extending through the U-shaped end portion of the wire, the ends of the rod being anchored to the bank and the bed of a stream.

With these and other objects in view, the invention consists of the novel features of construction, combination and arrangement of parts hereinafter fully described and claimed, and illustrated in the accompanying drawings, in which—

Figure 1 is a perspective view of the invention illustrating its practical operation; Fig. 2 is a detail perspective view of the trap holding devices; and Fig. 3 is an enlarged detail section showing the holder upon the anchored rod.

Referring more particularly to the drawings 5 indicates a rod or wire of suitable length which is formed with an eye 6 at each end. The ends of this wire or rod may be twisted, tied or otherwise secured to roots or the branches of bushes upon the bank of a stream. As clearly shown in Fig. 1, suitable anchoring pegs P or other suitable means are received in these eyes and are adapted to be driven or otherwise secured to the bank and the bed of a stream in which the trap is to be set. The trap T may be of any of the well known forms which are particularly adapted for the trapping of water animals and has a chain C secured thereto at one of its ends.

Upon the rod 5 the trap holding device 7 is arranged and is adapted to be manually adjusted thereon to position the same properly on the rod in accordance with the location of the trap upon the bed of the stream. This holding device comprises a single length of wire which is in the general form of a rectangular loop, as indicated at 8. It will be understood that the wire is of suitable gage in accordance with the particular specie of animal or other game being trapped. This wire is twisted intermediate of its ends to form an eye or loop 9 which extends from one end of the body loop 8 of the holder. To this eye 9 the other end of the trap chain C is attached. One end of the wire of which the holder 7 is formed is coiled, as indicated at 10, and between the coils is extended to form an open U-shaped loop 11. The other end of the wire is disposed through the coils 10, as shown at 12, and has its extremity 12' bent or split to prevent the withdrawal of the end of the wire from said coils. In this manner the ends of the wire are held securely connected so that the holder is retained upon the wire rod 5. This rod extends through the loop 11, the open end of which is closed by means of the end 12 of the wire holder 7.

In the practical operation of the device, the rod 5 is securely anchored, as shown in Fig. 1, and the holder 7 properly positioned thereon. After the trap has been set and placed, it will be seen that when the animal becomes caught therein, should he attempt to escape to the shore, the pull upon the lower end of the angularly disposed holder 7 will cause the end portion 12 of the wire to bind upon the rod 5, thus preventing the longitudinal sliding movement of the holder on said rod. Thus it will be obvious that the animal can only move in one direction, viz, out into the stream. Thus it will be seen that he is held under the water so that it will be impossible for him to escape drowning. Thus the trapper is assured against the escape of the animal after he has once been caught. The holding device is so arranged on the wire or rod that the pull upon the same which is exerted by the animal in his efforts to escape from the trap will not act to uncoil the end of the wire of which said latter is formed. The animal after being caught in the trap will immediately dive into the water, the holder sliding down on the rod or wires, thus keeping the animal in deep water and preventing its escape to the bank of the stream, the loop or band of the holding device securely binding against the rod or wire 5. In this manner the drowning of the animal after being caught is absolutely assured.

It will be noted upon reference to Fig. 1 that the holder 7 is positioned on the wire or rod 5 with its loop 9 disposed downwardly and outwardly toward the bed of the stream, the holder being positioned at an inclination to the rod. It is believed that the construction and operation of the device will be readily understood from the foregoing description and while I have specifically set forth the preferred embodiment of the invention, it will be understood that the same is susceptible of many minor modifications without departing from the essential feature or sacrificing any of the advantages thereof.

Having thus described the invention what is claimed is:

1. A device of the character described comprising a trap holding device formed from a single length of wire bent intermediate of its ends to provide a loop for attachment to one end of a trap chain, one end of said wire being coiled and extended intermediate of the coils to form an open loop, the other end of said wire extending through the coils to close said loop, in combination with an anchored rod extending through the loop beneath the last named end of the wire, said wire binding upon the rod in the efforts of an animal caught in the trap to escape and preventing the movement of said holding member on said rod.

2. In a device of the character described, the combination of a rod anchored at its ends, a holding device constructed from a single length of wire twisted intermediate of its ends to form a loop, an animal trap, a chain connected at its ends to said trap and the loop in said wire, means for connecting the ends of the wire, one end of said wire being bent into substantially U-shaped form beneath the other end thereof to receive said rod whereby the latter will bind on the rod in the efforts of an animal caught in the trap to escape by moving the trap.

In testimony whereof I hereunto affix my signature in the presence of two witnesses.

VALENTINE CRITES.

Witnesses:
BLAIR BEVERAGE,
CHESTER COOPER.

---

Copies of this patent may be obtained for five cents each, by addressing the "Commissioner of Patents, Washington, D. C."